United States Patent Office 3,163,262
Patented Dec. 29, 1964

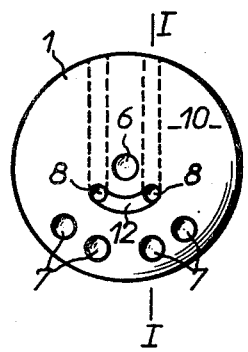
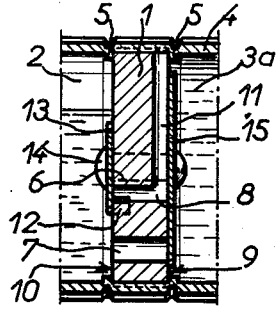
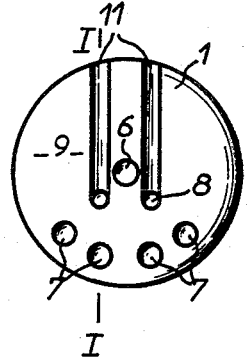
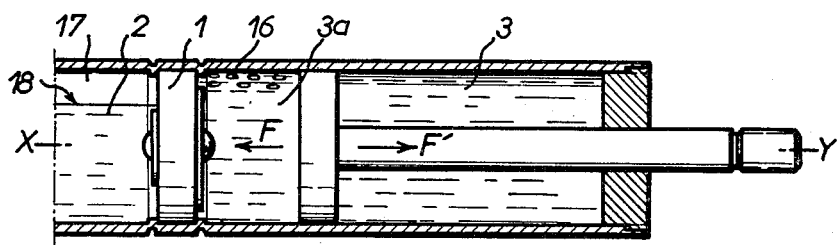
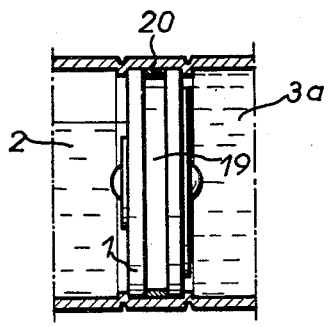
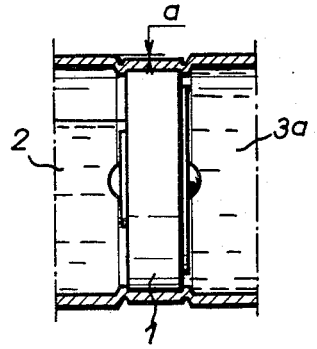

3,163,262
HYDRAULIC TELESCOPIC SHOCK ABSORBERS
Fernand Stanislas Allinquant, 53 Ave. Le Notre,
Sceaux, Seine, France
Filed Oct. 31, 1962, Ser. No. 234,465
Claims priority, application France, Nov. 7, 1961,
878,218
2 Claims. (Cl. 188—100)

This invention relates to hydraulic telescopic shock absorbers, and is concerned with an improved arrangement of such shock absorbers which have their axes at least substantially horizontal.

Hydraulic telescopic shock absorbers have a working chamber in which a piston moves to produce the flow of hydraulic fluid which in turn produces all or part of the shock-absorbing or damping force. They also include a reservoir in which a varying portion of the fluid is stored according to the variations in volume caused either by the displacement of the piston rod or by changes in temperature. Between the working chamber and the reservoir a partition is generally located to ensure the separation of the working chamber and reservoir. Bores serve to transfer fluid from one side of this partition to the other and as it is frequently too difficult to calibrate such bores to ensure close control of the rates of flow the bores are usually and preferably provided with valves the exactly determined calibrations of which enable rates of flow of specific characteristics to be obtained.

In hydraulic telescopic shock absorbers having a reservoir separated from the working chamber in the foregoing manner the reservoir is only partially filled with the liquid, the remaining space being filled with gas. The rapid movements at the surface of the liquid in contact with the gas tend to produce an emulsion detrimental to the satisfactory operation of the shock absorber and various devices have been introduced to prevent or retard the appearance of the emulsion. However, this is the case when the gas contacts the liquid in the reservoir only, that is in a vertical or almost vertical position of the shock absorber.

On the other hand, if the hydraulic telescopic shock absorber is at least substantially horizontal, the gas may contact the liquid in all parts of the shock absorber, i.e. not only in the reservoir but also in the working chamber. Special reservoir arrangements have already been proposed for keeping the gas in this part of the shock absorber but it is very difficult to eliminate it from the working chamber and this causes operating trouble. The present invention has for its object a new or improved arrangement of the separating partition, and of the valves with which it is fitted, which permits complete elimination of the gas from the working chamber.

The invention comprises a hydraulic telescopic shock absorber having its axis inclined at least substantially horizontal and comprising a working chamber in which a piston moves and a reservoir in which the liquid is contacted by a compressed gas, said working chamber and said reservoir being separated by a partition in which there are two series of bores closed respectively by two valves or series of valves each operating in one direction of movement of the piston, wherein the bores permitting the flow, from the working chamber towards the reservoir of the liquid, which may be partially emulsified, are open at the top of said working chamber, thus enabling the return of the gas forming the emulsion towards the reservoir to be ensured.

Preferably the aforesaid bores opening at the top of the working chamber comprise holes extending through said partition and substantially vertical grooves forming continuations of said holes and hollowed out in that face of the partition which is directed towards the working chamber and which are covered in the part adjacent the axis of the shock absorber by a plate forming a valve for the bores of the other series.

Constructional embodiments of the invention will now be more particularly described, by way of example, with reference to the accompanying drawings, in which:

FIGURE 1 is a side elevational view of a cross-section through an assembly according to the invention, taken along lines I—I of FIGURES 2 and 3, FIGURES 2 and 3 are views of the partition from the left and right side respectively with the valves removed, FIGURE 4 is a general view of the device in the body of a shock absorber, and FIGURES 5 and 6 illustrate modified methods of fitting the device.

It will be understood that in the following description of the drawings the axis of the shock absorber is horizontal and extends along the line X–Y of FIGURE 4 (or slightly inclined with respect to the horizontal) and that the top of the device is at the top of the figure.

As shown in FIGURE 1, a partition 1 separates the reservoir 2 from the working chamber 3. This partition 1 is fitted with great precision in the tube 4, the external diameter of the partition 1 and the internal diameter of the tube 4 being equal, except for the tolerances which enable them to be assembled. The partition 1 is held in place in the tube 4 by stamped-in grooves 5 in the wall or by any other known means. Its faces 9 and 10 may be hollowed out in the form of very open or wide cones, the apices of which would be on the axis of the partition.

The partition 1 is perforated:

At its centre by a hole 6 permitting the fitting of the means for fixing elastic valves, Along an arc, by a plurality of holes 7 of the same diameter located near the lower periphery of the partition, and Along an arc, concentric with the first-mentioned arc but of smaller radius, by two holes 8.

On the face 9 of the partition 1 (FIG. 3), the holes 8 each open into a groove 11 hollowed out parallel to the vertical diameter and opening on to the upper periphery of the partition, opposite the holes 7.

On the face 10 of the partition 1 (FIG. 2), the holes 8 can open into a groove 12 ensuring the intercommunication thereof. On the same face 10, a valve constituted by one or more washers or discs 13, made of tempered steel or any other suitable flexible material, closes the holes 8 (or the groove 12 when this is present), the diameter of the disc 13 being slightly greater than the diameter of the circle circumscribed around the holes 8 (or the outer diameter of the groove 12). This valve is retained by the rivet 14.

This same rivet 14, which extends through the partition 1 by way of the hole 6, fastens, on the face 9, another valve 15 which likewise consists of one or more flexible elastic washers which close the holes 7 since the outer diameter of the valve 15 is slightly greater than the diameter of the circle circumscribed around the holes 7.

There has been stipulated above for the partition 1 such conditions of fitting within the tube 4 as to ensure fluid-tightness throughout the length of the periphery of the partition. If difficulty is presented in achieving this fluid-tightness geometrically, FIGURE 5, shows another possible known constructional arrangement resulting from the provision of a circular groove 19, at the outer periphery of partition 1, in which there is housed a packing 20 of suitable plastic material, the dimensions of which will ensure the blocking of any flow of fluid between the chambers 2 and 3. It is also possible to achieve this peripheral fluid-tightness of the partition 1 as shown in FIGURE 6, in which a continuous circular constriction of the tube 4, indicated by the letter $a$, is effected opposite the partition when it has been placed in the tube fully equipped with its valves, in a manner known per se.

Referring to FIGURE 4, the operation is therefore as follows:

In the working chamber 3 there is the liquid fluid and a certain amount of gas accumulated in the upper part as indicated at 16. The movement of the piston of the shock absorber in the working chamber 3 first forces the gas to be located with the liquid fluid between the said piston and the partition 1 in the compartment 3a. As the piston approaches the partition 1, in the direction F, the liquid fluid and the gas escape towards the reservoir by way of the grooves 11 and the holes 8, through which they pass freely, raising the valve 13. In the reservoir the gas is freed at 17, escaping to its natural sphere provided above the free level 18 of the fluid. When the piston moves away from the partition 1, in the direction F', a return of fluid is produced into the chamber 3, both by the reduced pressure produced in the compartment 3a and the pressure exerted by the gas on the fluid in the reservoir. The transfer from the reservoir is effected through the holes 7, by the raising of the valve 15, which has precisely the appropriate resistance. It will be seen that at this instant the valve 13 is closed and that there cannot be any reentry therethrough of the gas contained in the reservoir 2 in the direction of the working chamber 3.

What is claimed is:

1. A hydraulic telescopic shock absorber whose main axis extends at least substantially horizontally comprising a working chamber and a piston, said piston being arranged movably in said working chamber, a reservoir, a liquid partially filling the lower part of said reservoir and a compressed gas filling partially the upper part of said reservoir not filled by said liquid, a partition separating said reservoir and said working chamber, said partition provided with a first and a second series of bores, first check valve means for said first series of bores and second check valve means for said second series of bores, said first check valve means permitting flow from the working chamber into the reservoir when the piston moves toward said partition, said second check valve means permitting flow from the reservoir to the working chamber when the piston moves away from said partition, said first series of bores controlled by said first check valve means being open at the top of said working chamber, whereby gas that may have entered the working chamber and may be emulsified is enabled to return to the reservoir and to be replaced by liquid, said first series of bores comprising holes extending through said partition and substantially vertical grooves forming continuations of said holes and being hollowed out in the face of the partition defining the working chamber, said grooves being covered in an area adjacent the axis of the shock absorber by said second check valve means.

2. A shock absorber according to claim 1, wherein said bores extend through the partition below its horizontal diameter.

References Cited by the Examiner

UNITED STATES PATENTS

| 1,780,531 | 11/30 | Messier | 267—64 |
| 1,855,064 | 4/32 | Messier | 188—100 |

FOREIGN PATENTS

| 69,446 | 7/58 | France. |
| 769,319 | 3/57 | Great Britain. |

ARTHUR L. LA POINT, *Primary Examiner.*